Patented Mar. 24, 1942

2,277,262

UNITED STATES PATENT OFFICE 2,277,262

AZO DYESTUFFS

Eberhard Stein, Leverkusen-Schlebusch, Carl Taube, Leverkusen-I. G.-Werk, and Siegfried Petersen, Cologne-Mulheim, Germany, assignors to General Aniline & Film Corporation, New York, N. Y., a corporation of Delaware No Drawing. Application January 18, 1940, Serial No. 314,452. In Germany January 25, 1939

4 Claims. (Cl. 260—181)

The present invention relates to new azodyestuffs and to a method of preparing the same; more particularly it relates to asymmetric azodyestuffs of the general formula:

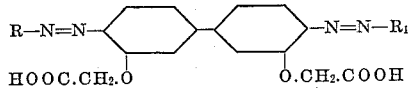

In this formula R stands for the radical of 2-amino-5-hydroxynaphthalene-7-sulfonic acid, its substitution products or its 1-azo-compounds and $R_1$ stands for the radical of a hydroxynaphthalene, an aminohydroxynaphthalene, the sulfonic or carboxylic acids thereof or a pyrazolone or also a 1-azo compound of 2-amino-5-hydroxynaphthalene-7-sulfonic acid; R and $R_1$ shall, however, be different from each other.

The new asymmetric azodyestuffs can be obtained by coupling 1 molecular proportion of tetrazotized 4.4'-diaminodiphenyl-3.3'-dihydroxyacetic acid with 1 molecular proportion of 2-amino-5-hydroxynaphthalene-7-sulfonic acid, its substitution products or 1-azo-compounds and 1 molecular proportion of a hydroxynaphthalene or an aminohydroxynaphthalene, the sulfonic or carboxylic acids thereof or a pyrazolone or also a 1-azo-compound of 2-amino-5-hydroxynaphthalene-7-sulfonic acid, whereby the two coupling components shall be different from each other. As substitution products of 2-amino-5-hydroxynaphthalene-7-sulfonic acid may be used N-alkyl-, N-aralkyl-, N-aryl-, N-acyl-, N-aroyl-derivatives, halogen or $SO_3H$-substitution products and as 1-azo-compounds the mono- and disazodyestuffs obtainable by coupling 2-amino-5-hydroxynaphthalene-7-sulfonic acid in acid medium with a diazo compound, coupling taking place in this case in the 1-position. As second coupling components may be used 1- and 2-hydroxynaphthalene, the amino, alkylamino, arylamino, acylamino, aroylamino, —$SO_3H$ and —COOH derivatives thereof, pyrazolones and 1-azo-compounds of 2-amino-5-hydroxynaphthalene-7-sulfonic acid.

The new dyestuffs dye cellulosic fibers in general grey to black shades. When aftertreating the dyeings with agents yielding metals, especially with copper salts, the fastness properties of the dyeings become improved. The new dyestuffs are distinguished over the dyestuffs known from German specification 61,053 by better fastness properties, especially by better fastness to light and washing. In comparison with the dyestuffs known from French specification 818,154 the new dyestuffs have the advantage that by them the series of the fast dyestuffs metallizable on the fiber has been extended to subdued grey, blackish blue and black shades.

The following examples illustrate the invention without, however, limiting it thereto.

Example 1

To the aqueous tetrazo solution of 0.029 mol 4.4'-diamino-3.3'-diphenoxy-acetic acid (corresponding to 4 g. of sodium nitrite) which has been neutralized with sodium bicarbonate or sodium acetate the solution of 0.029 mol of the sodium salt of the disazodyestuff of the formula:

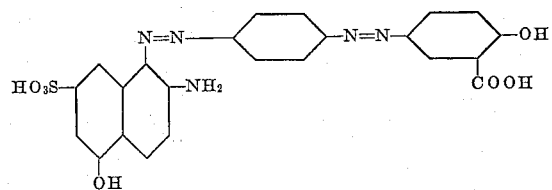

(corresponding to 2 g. of sodium nitrite) and 6 g. of anhydrous sodium carbonate in 500 cc. of water are slowly added with stirring and continuous cooling to 0° C. The mixture is stirred at this temperature until free tetrazo compound can no longer be detected. Now the reaction product is run into a solution consisting of 0.034 mol of 2-amino-8-hydroxynaphthalene-6-sulfonic acid (corresponding to 2.1 g. of sodium nitrite) and 15 g. of anhydrous sodium carbonate in 250 cc. of water, keeping the solution at 0° C. and stirring until the coupling is complete. The dyestuff is filtered off and in order to purify it separated again from weakly sodium carbonate alkaline solution by adding sodium chloride.

This dyestuff may also be prepared in the following manner: To the icecold neutralized tetrazo solution first the sodium carbonate alkaline solution of 0.029 mol of 2-amino-8-hydroxy-6-sulfonic acid is added. When the coupling is complete the reaction product is separated by adding sodium chloride, filtered off, made to a paste with little water and stirred at —5° C.

into the ammoniacal solution of the above disazodyestuff in aqueous pyridine. The dyestuff corresponds in its free state to the following formula:

If in the above combination the 2-amino-8-hydroxynaphthalene-6-sulfonic acid is replaced by equivalent quantities of the coupling components enumerated in the following table dye-

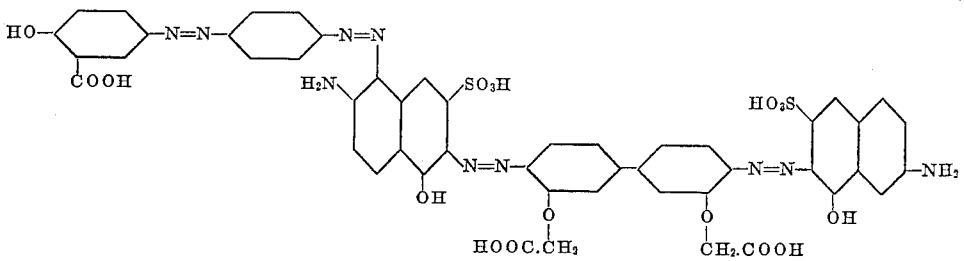

and dyes cotton dark grey shades; the dyeing aftertreated with copper salts is also dark grey.

stuffs are obtained yielding on cotton the following shades:

| Coupling components | Dyeing on cotton | Dyeing on cotton aftertreated with copper salts |
|---|---|---|
| R=radical of the 2-amino-8-hydroxynaphthalene-6-sulfonic acid. | | |
| R—NH—⌬—COOH | Bluish grey | Grey. |
| R—NH—⌬—COOH | do | Do. |
| R—NH—⌬—SO₃H | do | Do. |
| R—NH.CO.CH₃ | do | Do. |
| R—NH.SO₂—⌬(CH₃)—OH, COOH | do | Bluish grey. |
| R—N(CH₃)—SO₂—⌬(CH₃)—OH, COOH | do | Do. |
| R—NH—CH₂—⌬(CH₃)—OH, COOH | do | Grey. |
| R—NH—⌬—OCH₃ | do | Do. |
| HO₃S—⌬(OH)(OH)—COOH | Reddish grey | Reddish grey. |
| R'=radical of the 2-amino-5-hydroxynaphthalene-7-sulfonic acid. | | |
| R'—NH.CO—⌬—NH₂ | Bluish grey | Bluish grey. |
| R'—NH.CH₂—⌬(CH₃)—OH, COOH | do | Do. |
| R''=2-amino-5-hydroxynaphthalene-7-sulfonic acid, —N=N is attached to the 1-position. | | |
| R''—N=N—⌬—OH, COOH | Grey | Grey. |

| Coupling components | Dyeing on cotton | Dyeing on cotton aftertreated with copper salts |
|---|---|---|
| 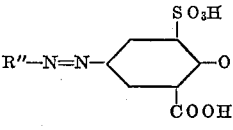 R''—N=N—(ring with SO₃H, OH, COOH) | Grey | Grey. |
| 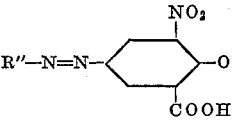 R''—N=N—(ring with NO₂, OH, COOH) | do | Do. |
| 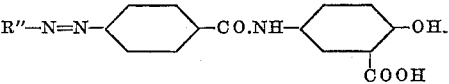 R''—N=N—(ring)—CO.NH—(ring with OH, COOH) | do | Do. |
| 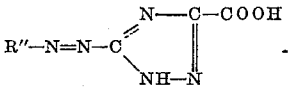 R''—N=N—C(pyrazolone ring with COOH, NH-N) | Bluish grey | Bluish grey. |

Example 2

To the aqueous tetrazo solution of 0.029 mol 4.4'-diamino-3.3'-diphenoxy-acetic acid (corresponding to 4 g. of sodium nitrite) which has been neutralized with sodium carbonate or sodium acetate the solution of 0.029 mol of the sodium salt of the monoazodyestuff of the formula:

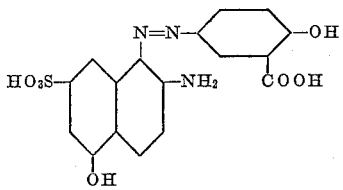

(corresponding to 2 g. of sodium nitrite) and 6 g. of anhydrous sodium carbonate in 350 cc. of water are slowly added with stirring and cooling to 0° C.; stirring is continued until free tetrazo compound can no longer be detected. Thereupon the reaction product is run into a solution consisting of 0.034 mol of 2-amino-8-hydroxynaphthalene-6-sulfonic acid (corresponding to 2.1 g. of sodium nitrite) and 15 g. of anhydrous sodium carbonate in 250 cc. of water, keeping the solution always at 0° C. and stirring until coupling is complete.

The preparation of the dyestuff can take place also in the reverse order as shown in Example 1. The final coupling can be carried out in this case without addition of pyridine.

The dyestuff after isolation and purification in the usual manner dyes cotton bluish grey shades; the dyeings aftertreated with copper salts are also bluish grey. In its free state the dyestuff corresponds to the following formula:

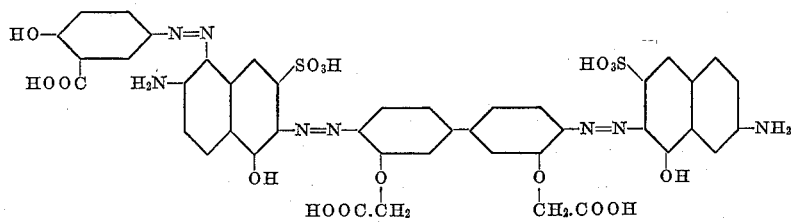

If in the above combination the 2-amino-8-hydroxynaphthalene-6-sulfonic acid is replaced by equivalent quantities of the coupling components enumerated in the following table dyestuffs are obtained yielding on cotton the following shades:

| Coupling components | Dyeing on cotton | Dyeing on cotton aftertreated with copper salts |
|---|---|---|
| R = radical of the 2-amino-8-hydroxynaphthalene-6-sulfonic acid. | | |
| 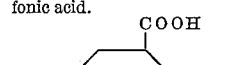 R—NH—(ring with COOH) | Dull navy blue | Dull navy blue. |
| 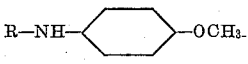 R—NH—(ring with OCH₃) | do | Do. |
|  R—NH—(ring with COOH, OH) | Bluish grey | Bluish grey. |
| R—NH.CO.CH₃ | do | Do. |
| 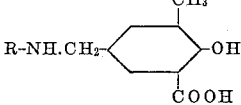 R—NH.CH₂—(ring with CH₃, OH, COOH) | Grey | Grey. |
| 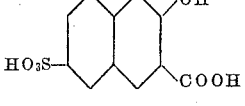 (naphthalene with OH, OH, HO₃S, COOH) | Bluish grey | Bluish grey. |
| R' = radical of the 2-amino-5-hydroxynaphthalene-7-sulfonic acid. | | |
| 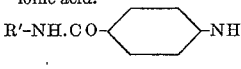 R'—NH.CO—(ring)—NH₂ | do | Do. |

Example 3

To the aqueous tetrazo solution of 0.029 mol 4.4'-diamino-3.3'-diphenoxy-acetic acid (corresponding to 4 g. of sodium nitrite) which has been neutralized with sodium bicarbonate or sodium acetate the solution of 0.029 mol of the sodium salt of the disazodyestuff of the formula:

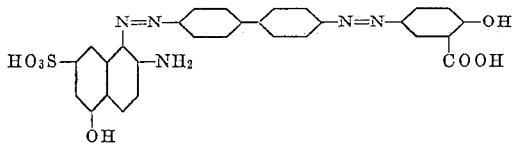

(corresponding to 2 g. of sodium nitrite) and 6 g. of anhydrous sodium carbonate in 500 cc. of water are slowly added with stirring and cooling to 0° C.; stirring is continued until free tetrazo compound can no longer be detected. Thereupon the reaction product is run into a solution consisting of 0.034 mol of 2-amino-8-hydroxynaphthalene-6-sulfonic acid (corresponding to 2.1 g. of sodium nitrite) and 15 g. of anhydrous sodium carbonate in 250 cc. of water, keeping the solution always at 0° C. and stirring until the coupling is complete.

The preparation of the dyestuff may take place also in the reverse coupling order as explained in Example 1.

The isolated and purified dyestuff dyes cotton dark grey shades. When aftertreated with copper salts also dark grey shades are obtained. The dyestuff corresponds in its free state to the following formula:

Example 4

To the aqueous tetrazo solution of 0.029 mol 4.4'-diamino-3.3'-diphenoxy-acetic acid (corresponding to 4 g. of sodium nitrite) which has been neutralized with sodium bicarbonate or sodium acetate the solution of 0.029 mol of 4-aminobenzoyl - 2 - amino-5-hydroxynaphthalene-7-sulfonic acid (corresponding to 2 g. of sodium nitrite) and 9 g. of anhydrous sodium carbonate in 350 cc. of water are slowly added with stirring and cooling to 0° C. Stirring at 0° C. is continued until the tetrazo compound is completely used up. Thereupon the reaction product is run into a solution consisting of 0.034 mol of 2.8-dihydroxynaphthalene-6-sulfonic acid-3-carboxylic acid (corresponding to 2.1 g. of sodium nitrite) and 15 g. of anhydrous sodium carbonate in 300 cc. of water, keeping the solution always at 0° C. and stirring until the coupling is complete.

The dyestuff is isolated in the usual manner. It corresponds in its free state to the following formula:

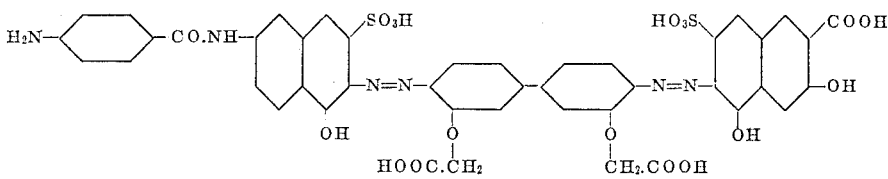

and dyes cotton bluish grey shades, the dyeings aftertreated with copper salts are also bluish grey.

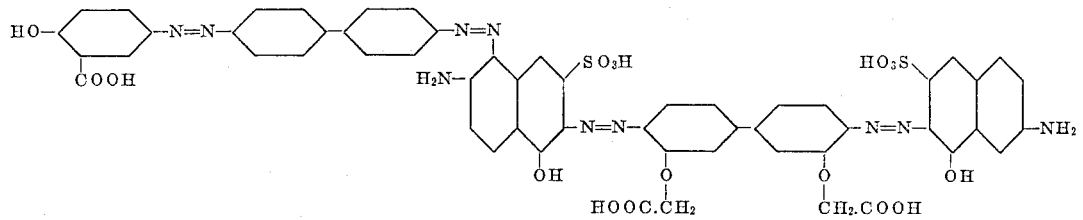

If in the above combination the 2-amino-8-hydroxynaphthalene-6-sulfonic acid is replaced by equivalent quantities of the coupling components enumerated in the following table dyestuffs are obtained yielding on cotton the following shades:

| Coupling components | Dyeing on cotton | Dyeing on cotton aftertreated with copper salts |
|---|---|---|
| R—NH—⌬—COOH | Grey | Grey. |
| 1-phenyl-5-pyrazolone-3-carboxylic acid. | Reddish grey | Reddish grey. |
| R=radical of the 2-amino-8-hydroxynaphthalene-6-sulfonic acid. | | |

Example 5

408 g. of the potassium salt of 4.4'-diamino-3.3'-diphenoxy-acetic acid are dissolved in ice cold water and after adding 600 g. of hydrochloric acid (sp. gr. 1.18) diazotized with 138 g. of sodium nitrite. After some time the solution is rendered acetic by adding sodium acetate. Thereupon the aqueous solution of 367 g. of the sodium salt of 2-(4'-anisidyl)-5-hydroxynaphthalene-7-sulfonic acid is slowly added. The coupling is complete after 4 hours and the intermediate is sucked off and anew pasted with water. The paste thus obtained is added to a strongly sodium carbonate alkaline solution of 353 g. of 2-benzoylamino - 5 - hydroxynaphthalene-7-sulfonic acid; the coupling takes some time and is carried out towards the end at room temperature. The dyestuff is filtered off, pressed and dried. The dyestuff corresponds in its free state to the following formula:

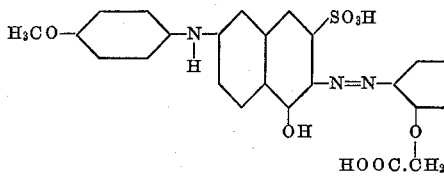 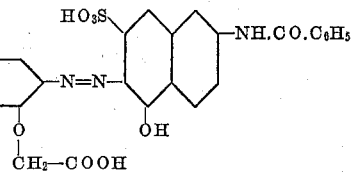

and dyes cotton and regenerated cellulose dark navy blue shades. By an aftertreatment with copper salts the dyeings become fast to light and washing.

A somewhat more reddish navy blue is obtained by combining tetrazotized 4.4'-diamino-3.3'-diphenoxy-acetic acid on the one side with 1-chloro - 2 - amino-5-hydroxynaphthalene-7-sulfonic acid and on the other side with 2-benzoylamino-5-hydroxynaphthalene-7-sulfonic acid or the derivatives thereof substituted in the aroyl radical.

*Example 6*

408 g. of the potassium salt of 4.4'-diamino-3.3'-diphenoxy-acetic acid are diazotized as stated in Example 5 and to the solution sodium acetate is added until the acid reaction to Congo red paper has disappeared. At low temperature an aqueous solution of 364 g. of the potassium salt of 2-benzoylamino-5-hydroxynaphthalene-7-sulfonic acid and 500 g. of sodium bicarbonate is slowly added drop by drop. The violet-blue coupling product is sucked off after some hours and the paste is added to an ice cold sodium carbonate alkaline solution of 375 g. of 2-(2'.4'-dimethoxyphenylamino)-5-hydroxynaphthalene-7-sulfonic acid. If necessary the coupling is finished with the addition of pyridine and worked up as usual. The dyestuff which corresponds in its free state to the following formula:

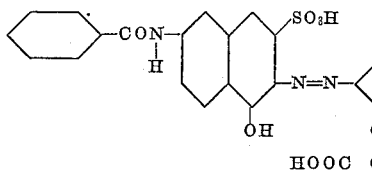 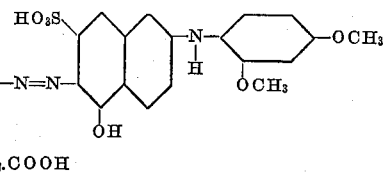

and dyes cellulosic fibers navy blue shades. By an aftertreatment with copper salts the fastness properties of the dyeings become improved.

The 2 - (2'.4' - dimethoxyphenylamino) -5-hydroxynaphthalene-7-sulfonic acid used above is obtainable for instance by allowing 1.6-dihydroxynaphthalene-3-sulfonic acid to react with 1-amino-2.4-dimethoxybenzene in aqueous solution in the presence of sodium bisulfite or by boiling 2-amino-5-hydroxynaphthalene-7 - sulfonic acid and 1-amino-2.4-dimethoxybenzene in aqueous solution with sodium bisulfite and ammonium bisulfite.

We claim:

1. As new products asymmetric azodyestuffs of the general formula

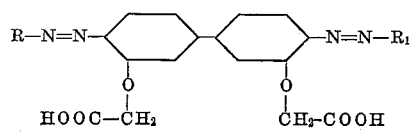

wherein R stands for the radical of a 1-aryl azo compound selected from the group consisting of mono- and disazo compounds of 2-amino-5-hydroxynaphthalene-7-sulfonic acid, aryl being a radicle of the benzene series and $R_1$ stands for the radical of a coupling component selected from the group consisting of 1- and 2-hydroxynaphthalene, the amino-, alkylamino-, arylamino-, acylamino-, aroylamino-, —$SO_3H$ and —COOH derivatives thereof, pyrazolones and 1-aryl azo compounds selected from the group consisting of mono- and disazo compounds of 2-amino-5-hydroxynaphthalene-7-sulfonic acid, aryl being a radicle of the benzene series, the radicals R and $R_1$ being different from each other, dyeing cellulosic fibers in general grey to black shades the fastness properties of which become improved by an aftertreatment with agents yielding metals.

2. As new products asymmetric azodyestuffs of the general formula:

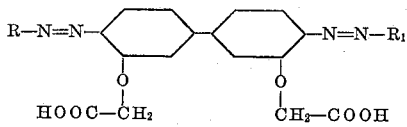

wherein R stands for the radical of a 1-aryl azo compound selected from the group consisting of mono- and disazo compounds of 2-amino-5-hydroxynaphthalene-7-sulfonic acid containing an o-hydroxycarboxylic acid grouping aryl being a radicle of the benzene series and $R_1$ stands for the radical of a coupling component selected from the group consisting of 1- and 2-hydroxynaphthalene, the amino-, alkylamino-, arylamino-, acylamino-, aroylamino-, —$SO_3H$ and —COOH derivatives of 1- and 2-hydroxynaphthalene pyrazolones and 1-aryl azo compounds selected from the group consisting of mono- and disazo compounds of 2-amino-5-hydroxynaphthalene-7-sulfonic acid, aryl being a radicle of the benzene series, the radicals R and $R_1$ being different from each other, dyeing cellulosic fibers in general grey to black shades the fastness properties of which become improved by an aftertreatment with agents yielding metals.

3. As new products asymmetric azodyestuffs of the general formula:

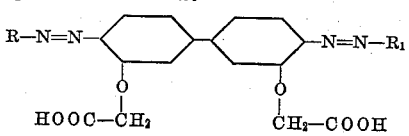

wherein R stands for the radical of a 1-aryl azo compound selected from the group consisting of mono- and disazo compounds of 2-amino-5-hydroxynaphthalene-7-sulfonic acid, containing an o-hydroxycarboxylic acid grouping aryl being a radicle of the benzene series and $R_1$ stands for the radical of an amino-hydroxynaphthalenesulfonic acid, the radicals R and $R_1$ being different from each other, dyeing cellulosic fibers in general grey to black shades the fastness properties of which become improved by an aftertreatment with agents yielding metals.

4. As new product the asymmetric azodyestuff corresponding in its free state to the formula:

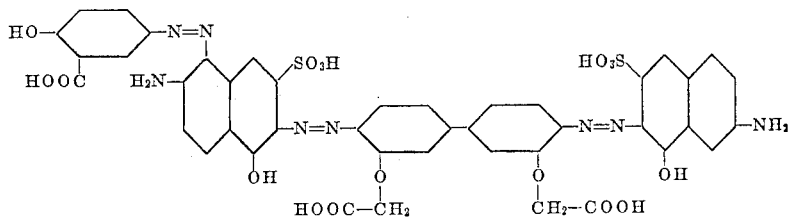

and dyeing cellulosic fibers bluish grey shades.

EBERHARD STEIN.
CARL TAUBE.
SIEGFRIED PETERSEN.